US010611592B1

(12) United States Patent
Wallace

(10) Patent No.: US 10,611,592 B1
(45) Date of Patent: Apr. 7, 2020

(54) AUTOMATIC MEDIA LOADER FOR FEEDER

(71) Applicant: Walco Systems, Avon Lake, OH (US)

(72) Inventor: Robert Brian Wallace, Avon, OH (US)

(73) Assignee: Walco Systems, Avon Lake, OH (US)

( * ) Notice: Subject to any disclaimer, the term of this patent is extended or adjusted under 35 U.S.C. 154(b) by 169 days.

(21) Appl. No.: 15/992,433

(22) Filed: May 30, 2018

Related U.S. Application Data

(60) Provisional application No. 62/513,192, filed on May 31, 2017.

(51) Int. Cl.
| | |
|---|---|
| *B65H 29/34* | (2006.01) |
| *B65G 47/44* | (2006.01) |
| *B65H 1/18* | (2006.01) |
| *B65G 47/18* | (2006.01) |
| *B65H 11/00* | (2006.01) |
| *B65G 47/02* | (2006.01) |
| *B65D 88/26* | (2006.01) |

(52) U.S. Cl.
CPC ............. *B65H 29/34* (2013.01); *B65G 47/02* (2013.01); *B65G 47/18* (2013.01); *B65G 47/44* (2013.01); *B65H 1/18* (2013.01); *B65H 11/002* (2013.01); *B65D 88/26* (2013.01); *B65H 2301/42134* (2013.01); *B65H 2301/42261* (2013.01)

(58) Field of Classification Search
CPC ........ B65H 1/22; B65H 11/00; B65H 11/002; B65H 11/005; B65H 29/34; B65H 2301/42254; B65H 2301/4225; B65H 2301/422; B65H 2301/4222; B65H 2511/152; B65G 21/14; B65G 15/30; B65G 19/185; B65G 47/02; B65G 47/04; B65G 47/06
See application file for complete search history.

(56) References Cited

U.S. PATENT DOCUMENTS

| | | | | |
|---|---|---|---|---|
| 3,705,719 A * | 12/1972 | Polit | ...................... | B65H 3/122 271/3.03 |
| 3,776,544 A * | 12/1973 | Watson | ................... | B65B 35/04 271/3.03 |
| 3,887,178 A * | 6/1975 | Fujimoto | ............... | B65H 1/266 271/30.1 |
| 4,148,473 A * | 4/1979 | Johnson | ................... | B65H 1/14 271/12 |
| 4,192,496 A * | 3/1980 | Baselice | ................ | B65H 1/263 198/463.3 |
| 5,924,839 A * | 7/1999 | Dopke | ................... | B65G 59/02 414/796 |
| 6,886,826 B2 * | 5/2005 | Leu | ........................ | B65H 5/085 271/10.14 |

(Continued)

*Primary Examiner* — Michael C McCullough
(74) *Attorney, Agent, or Firm* — Rankin, Hill & Clark LLP

(57) ABSTRACT

An automatic loader for delivering vertically stacked media to a hopper of a feeder. The automatic loader includes a powered conveying device, actuated plates, a first sensor, and a second sensor. The first sensors detects a height of the vertically stacked media that is in the hopper, and the second sensor detects a separation between the hopper and the vertically stacked media that is in a staging area of the conveying device. Based on signals generated by the first and second sensors, the conveying device automatically delivers the vertically stacked media that is in the staging area to the hopper of the feeder.

20 Claims, 7 Drawing Sheets

(56) References Cited

U.S. PATENT DOCUMENTS

| | | | |
|---|---|---|---|
| 7,677,543 B2 * | 3/2010 | Gulbrandsen | B65H 5/26 |
| | | | 198/418.1 |
| 7,704,037 B2 * | 4/2010 | Gerke | B65G 59/068 |
| | | | 414/797.6 |
| 8,113,503 B2 * | 2/2012 | Roth | B65H 3/042 |
| | | | 271/148 |

* cited by examiner

AUTOMATIC MEDIA LOADER FOR FEEDER

CROSS-REFERENCE TO RELATED APPLICATIONS

This application claims priority to U.S. Provisional Application 62/513,192, filed May 31, 2017, which is incorporated herein by reference.

BACKGROUND OF INVENTION

Field of Invention

The present invention relates to loaders for delivering flat media to a hopper of a feeder.

Description of Related Art

Traditional auto loaders for feeders have required flat media to be "shingled", or to be placed in a stack that is laid on its side (i.e. horizontal stack) in order to properly operate. The part of the machine on which the media is stacked in this way conveys the media along a continuous belt into an intermediary section, which prepares the media to fall into the hopper of the feeder. Because the products are on their side, or worse yet, arranged in a shingled array, only a limited amount of products can be staged on the belt conveyor. In most cases, the products must be meticulously arranged such that they will cascade properly into the feeder hopper. Examples of flat media include heavy card stock paper products or postcards, CD sleeves, bound books or publications, pads of paper, folded direct mail stationary, and bags that can be uniformly stacked. Thus, the amount of media which can be staged in a given area of an auto loader is hampered in the prior art (e.g., by the limitation of laying the product on its side).

BRIEF SUMMARY OF THE INVENTION

In view of the foregoing, the object of the invention is to provide an automatic loader for a feeder that allows for vertical stacks of flat media to be delivered to a hopper of a feeder.

This object is achieved by an automatic loader for delivering vertically stacked media to a hopper of a feeder that is associated with the loader. The loader includes a powered conveying device defining a staging area for the vertically stacked media. The staging area defines a discharge end arranged closest to the hopper. The conveying device is actuatable to move the vertically stacked media that is in the staging area in a first direction toward the discharge end, off of the conveying device, and into the hopper. The loader includes actuated plates movably arranged at the discharge end of the conveying device and actuatable to move between an extended state and a retracted state. When the actuated plates are in the extended state, the actuated plates support the vertically stacked media that is moved into the hopper in an elevated position above a feeder belt of the feeder. When the actuated plates are in the retracted state, the actuated plates do not support the vertically stacked media that is moved into the hopper in the elevated position, and the vertically stacked media that is moved into the hopper is thereby free to fall onto the feeder belt of the feeder. The loader includes a first sensor in communication with the conveying device and the actuated plates. The first sensor senses a height of the vertically stacked media that is in the hopper. When the height is less than a first predetermined threshold, the first sensor generates a first signal that a) causes the actuated plates to be in the extended state, and b) then causes the conveying device to move the vertically stacked media that is in the staging area in the first direction, off of the conveying device, into the hopper, and onto the actuated plates to be supported in the elevated position. The loader includes a second sensor in communication with the conveying device and the actuated plates. The second sensor senses a separation between the hopper and the vertically stacked media that is being moved in the first direction. When the separation is less than a second predetermined threshold, the second sensor generates a second signal that a) causes the conveying device to stop moving the vertically stacked media in the first direction, and b) then causes the actuated plates to move to the retracted state thereby allowing the vertically stacked media that was supported in the elevated position to fall onto the feeder belt of the feeder.

Preferably, a guide wall is arranged on one side of the conveying device, and is configured to guide the vertically stacked media that is in the staging area as it is moved in the first direction. The guide wall can extend in the first direction past the discharge end.

Preferably, a ramp is attached to an exit roller of the conveying device. The ramp and the exit roller may be arranged at the discharge end, and the ramp can be angled down going away from the exit roller.

In a preferred embodiment, the conveying device includes a powered conveyor belt assembly and a powered adjustable table. The powered conveyor belt assembly can include a first pair of rollers and a first continuous belt assembly arranged on the first pair of rollers. The conveyor belt assembly can be operable to rotate the first continuous belt assembly around the first pair of rollers. The powered adjustable table can include a second pair of rollers and a second continuous belt assembly arranged on the second pair of rollers. The adjustable table can be operable to rotate the second continuous belt assembly around the second pair of rollers. The adjustable table can be adjustable to increase or decrease a distance between the second pair of rollers. In this regard, a top surface of the first continuous belt assembly and a top surface of the second continuous belt assembly define the staging area. The top surface of the first continuous belt assembly may be coplanar with the top surface of the second continuous belt assembly. Rotation of the first continuous belt assembly around the first pair of rollers may be independent from rotation of the second continuous belt assembly around the second pair of rollers. The first continuous belt assembly includes a first set of separate continuous belts arranged around the first pair of rollers, and the second continuous belt assembly includes a second set of separate continuous belts arranged around the second pair of rollers. The loader can further include a power source for powering the conveying device. The power source can provide power to the conveyor belt assembly to rotate the first continuous belt assembly around the first pair of rollers, and the power source can provide power to the adjustable table to rotate the second continuous belt assembly around the second pair of rollers. The second set of rollers can include a fixed roller and an exit roller. The fixed roller may be arranged on a fixed frame and may be closer to the conveyor belt assembly than to the exit roller. The exit roller can be arranged on an adjustable frame connected the fixed frame and movable with respect to the fixed frame to thereby increase or decrease a distance between the fixed roller and the exit roller.

Preferably, when the vertically stacked media comprises at least a first vertical stack of media and a second vertical stack of media and the first vertical stack of media is closer to the hopper than the second vertical stack of media, then the first signal causes the conveying device to move the first vertical stack of media into the hopper. When the first vertical stack of media is moved into the hopper, the second signal is generated such that the second vertical stack of media remains on the conveying device. In this regard, the second signal a) causes the conveying device to move the second vertical stack of media in a second direction opposite from the first direction to create a gap between the first vertical stack of media and the second vertical stack of media; and b) then causes the actuated plates to move to the retracted state, thereby allowing the first vertical stack of media to fall onto the feeder belt of the feeder.

Preferably, the loader further includes a power source for powering the conveying device.

Preferably, the first sensor and the second sensor are laser sensors, and a beam emitted by the first sensor is perpendicular to a top surface of the vertically stacked media that is in the hopper. A beam emitted by the second sensor is perpendicular to a front surface of the vertically stacked media that is being moved in the first direction.

Preferably, the first sensor and the second sensor are arranged on the feeder.

Preferably, the loader further includes a controller in communication with the conveying device, the actuated plates, the first sensor, and the second sensor. The controller is configured to receive the first signal and the second signal, actuate the plates to move between the extended state and the retracted state, and actuate the conveying device to move the vertically stacked media that is in the staging area in the first direction.

The object of the invention is also achieved by a system for processing vertically stacked media including the automatic loader as just described, and a feeder including a hopper and a feeder belt under the hopper. The hopper includes a first side plate, a second side plate, and an end plate. The first sensor of the automatic loader is mounted to a top portion of the end plate, and a beam emitted by the first sensor is transmitted downward. The second sensor of the automatic loader is mounted at a side of the end plate opposite from hopper, and a beam emitted by the second sensor is transmitted through a hole in the end plate toward the automatic loader.

Preferably, the guide wall and the first side plate are coplanar, and the system further includes angled wall attached to the second side plate, and configured to funnel the vertically stacked media into the hopper.

The present invention allows for arranging the flat media in a vertical stack, as opposed to being organized in a shingled array, for delivery to a hopper of a feeder. This arrangement allows for more media to be staged on the automatic loader for delivery to the feeder, thus reducing the time that would otherwise be required for intermittently re-loading the automatic loader with media in a shingled array. In addition, less care is required when loading the media because the media does not have to be meticulously arranged in a shingled array. Instead, the media is simply stacked vertically, one piece upon another, and advanced toward, and delivered to a hopper while maintaining the media in this vertically stacked configuration.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
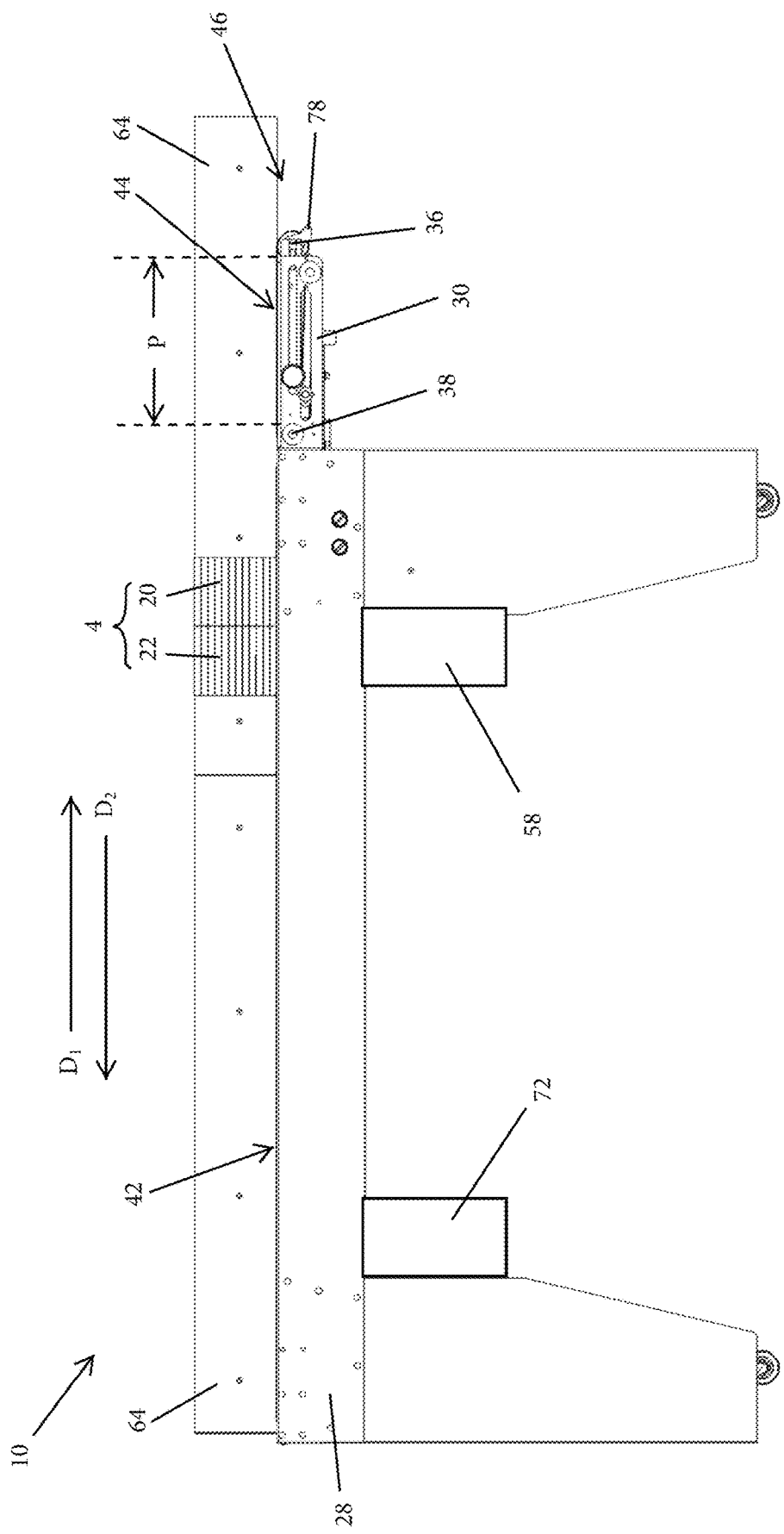
FIG. 1 is a side view of an automatic loader according to an embodiment of the invention.

With reference to FIGS. 1-6, there is shown an automatic loader 2 and a feeder 8 that is associated with the loader. The loader 2 is configured to deliver vertically stacked media 4 to the hopper 6 of the feeder 8. The automatic loader 2 includes a powered conveying device 10, actuated plates 12, 14, a first sensor 16, and a second sensor 18.

As depicted in FIG. 1, the vertically stacked media 4 can include a first vertical stack 20 of flat media and a second vertical stack 22 of flat media, where the first vertical stack 20 is closer to the hopper 6 than the second vertical stack 22. More or less vertical stacks of flat media may be loaded on the automatic loader 2. This is shown for example in FIGS. 3-6, where an additional third vertical stack 24 of flat media is loaded on the automatic loader 2.

Figure 2:
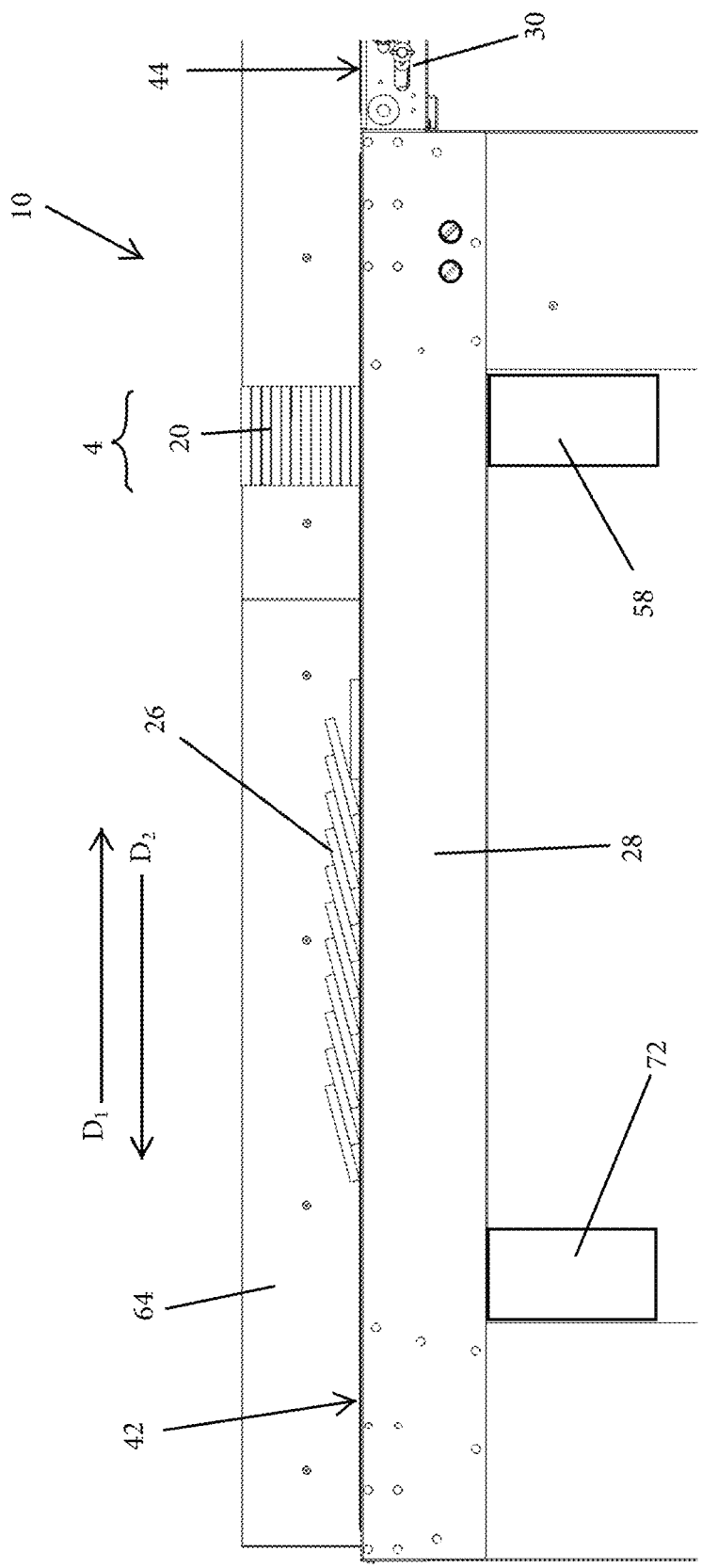
FIG. 2 is a side view of a portion of an automatic loader according to an embodiment of the invention.

FIG. 2 illustrates a more detailed view of the automatic loader 2, where the second vertical stack 22 of flat media has been arranged, not vertically, but in a shingled array 26. This depiction of the flat media in the shingled array 26 in FIG. 2 is provided for reference, and does not necessarily depict normal operation of the automatic loader 2. It is apparent that given the same number of pieces of flat media, the second vertical stack 22 occupies a far lesser area on the automatic loader 2 than the shingled array 26. Stacking the flat media in vertical stacks presents an advantage that is an improvement on all known autoloaders that supply feeders with flat media, and contributes to the novelty of the invention.

The powered conveying device 10 includes a powered conveyor belt assembly 28 and a powered adjustable table 30. The conveyor belt assembly 28 includes a first pair of rollers (with a front roller 32 of the first pair of rollers shown in FIGS. 3-6) and a first continuous belt assembly 34 arranged on the first pair of rollers. The first continuous belt assembly 34 can comprise one or more continuous belts. The conveyor belt assembly 28 is operable (i.e. powered) to rotate the first continuous belt assembly 34 around the first pair of rollers. In one embodiment (FIGS. 3-6), the first continuous belt assembly 34 comprises a first set of separate continuous belts arranged around the first pair of rollers.

The powered adjustable table 30 includes a second pair of rollers 36, 38, and a second continuous belt assembly 40 arranged on the second pair of rollers 36, 38. The second continuous belt assembly 40 may comprise one or more continuous belts. The adjustable table 30 is operable (i.e. powered) to rotate the second continuous belt assembly 40 around the second pair of rollers 36, 38. In one embodiment (FIGS. 3-6), the second continuous belt assembly 40 comprises a second set of separate continuous belts arranged around the second pair of rollers 36, 38.

Roller 36 is also referred to herein as the exit roller 36, and roller 38 is also referred to herein as the fixed roller 38. The fixed roller 38 is arranged closer to the conveyor belt assembly 28 than the exit roller 36, and the exit roller 36 is arranged closer to the discharge end 46 than the fixed roller 38, e.g. at the discharge end 46.

The adjustable table 30 is adjustable to increase or decrease a distance P between the second pair of rollers 36, 38. The distance P can be adjusted by moving the exit roller 36 relative to the fixed roller 38. In one embodiment, the fixed roller 38 is arranged on a fixed frame 66 and the exit roller 36 is arranged on an adjustable frame 68 that can be moved with respect to the fixed frame 66 to thereby increase or decrease the distance P between the fixed roller 38 and the exit roller 36. The fixed frame 66 may be attached to the conveyor belt assembly 28. The adjustable frame 68 may be moved relative to the fixed frame 66 by a rack gear set that can be manually operated by a user of the automatic loader 2. The adjustable table 30 may include one or more other rollers that are used to arrange the second continuous belt assembly 40 in a serpentine fashion such that the distance P can be altered without changing a fixed length of the second continuous belt assembly 40. The distance P may be adjusted in order to accommodate different sizes of vertically stacked media 4 or to align the discharge end 46 of the conveyor belt assembly 28 with the hopper 6 so the vertically stacked media 4 can be delivered to the hopper 6.

The conveyor belt assembly 28 may be actuated separate from the adjustable table 30 such that rotation of the first continuous belt assembly 34 around the first pair of rollers is independent from rotation of the second continuous belt assembly 40 around the second pair of rollers 36, 38. For example, the first continuous belt assembly 34 and the second continuous belt assembly 40 may be rotated at the same time in the same or opposite directions, or one may be rotated in either direction while the other is not rotating.

A top surface 42 of the first continuous belt assembly 34 and a top surface 44 of the second continuous belt assembly 40 define a staging area for the vertically stacked media 4, where the vertically stacked media 4 may be arranged for delivery by the automatic loader 2 to the hopper 6 of the feeder 8. The staging area may accept one or more vertical stacks of media. The top surface 42 of the first continuous belt assembly 34 can be coplanar with the top surface 44 of the second continuous belt assembly 40.

The conveying device 10 includes a discharge end 46 that is arranged closest to the hopper 6. The conveying device 10 is actuatable to move the vertically stacked media 4 that is in the staging area in a first direction $D_1$ toward the discharge end 46, off of the conveying device 10, and into the hopper 6.

Figure 4:
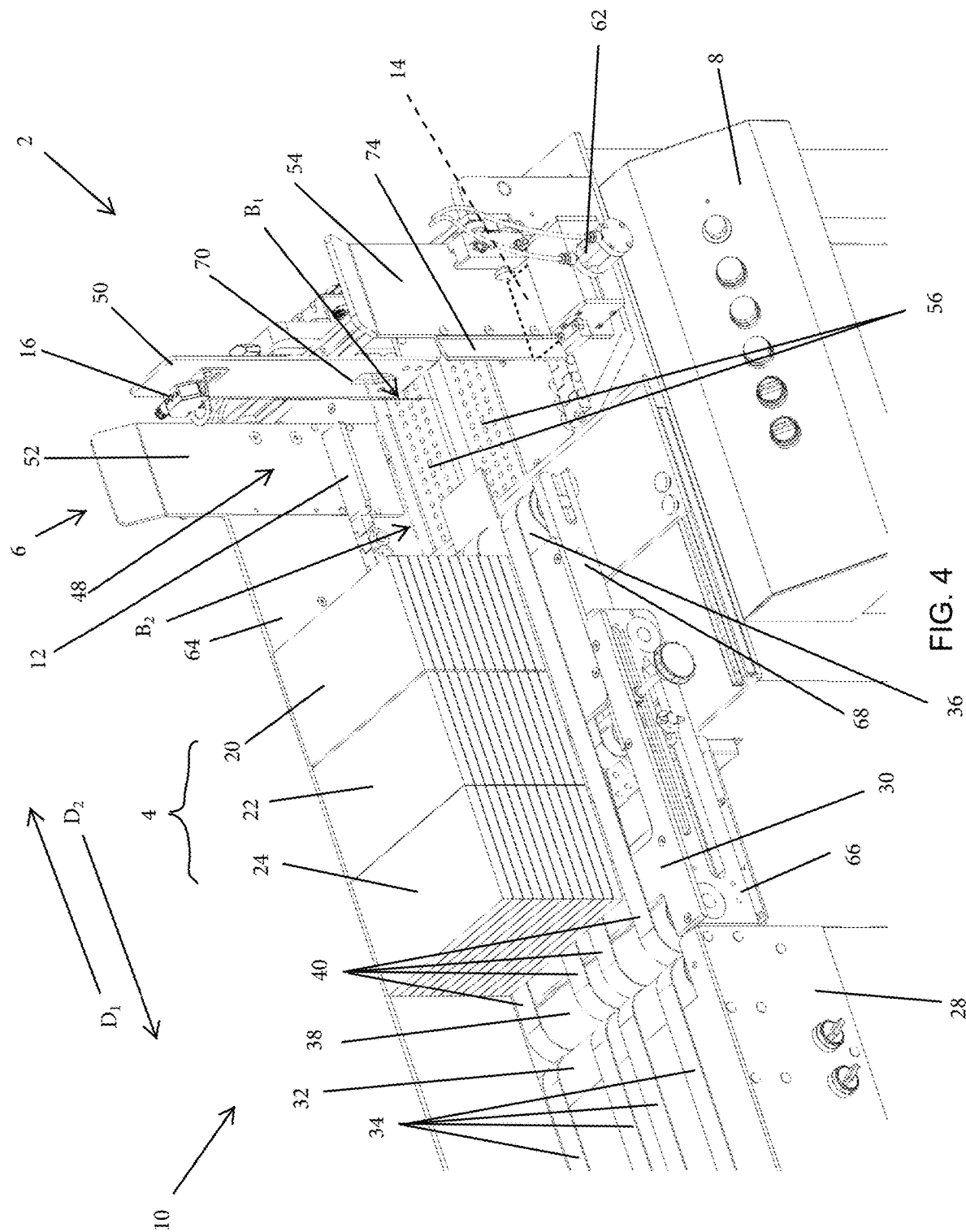
FIG. 4 is a perspective view of a portion of an automatic loader and feeder according to an embodiment of the invention.
Figure 5:
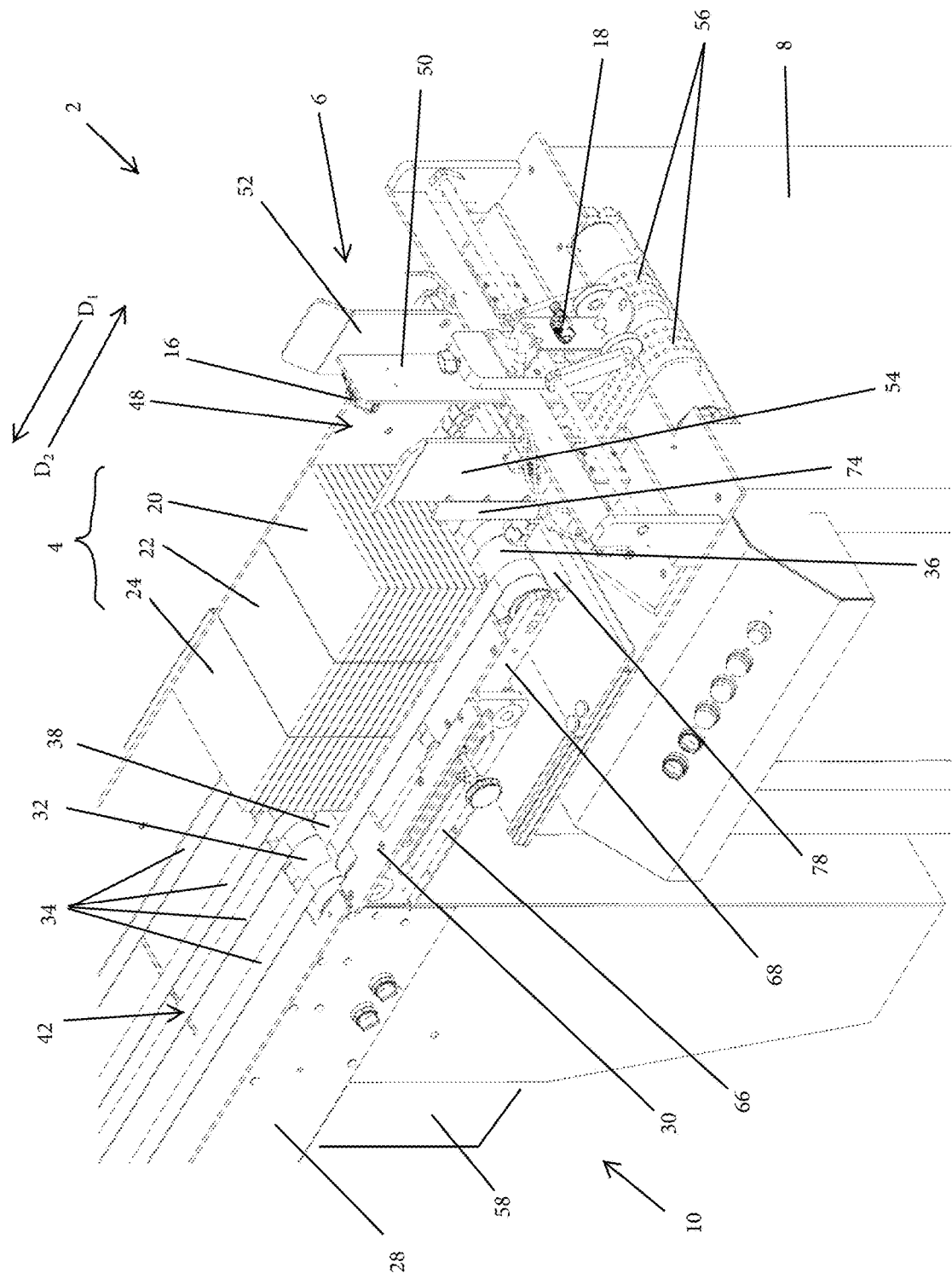
FIG. 5 is a perspective view of a portion of an automatic loader and feeder according to an embodiment of the invention.
Figure 6:
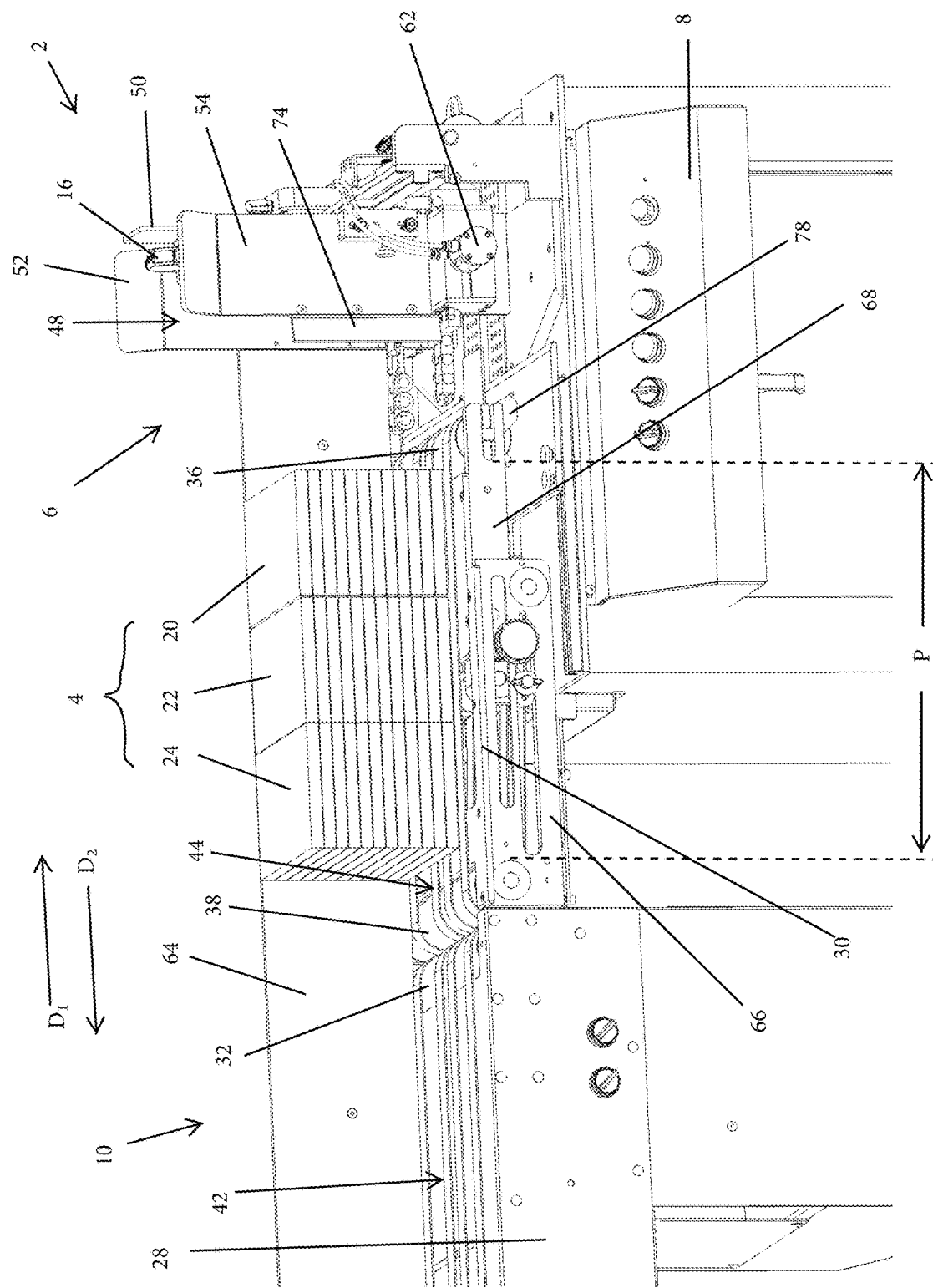
FIG. 6 is a perspective view of a portion of an automatic loader and feeder according to an embodiment of the invention.
Figure 7:
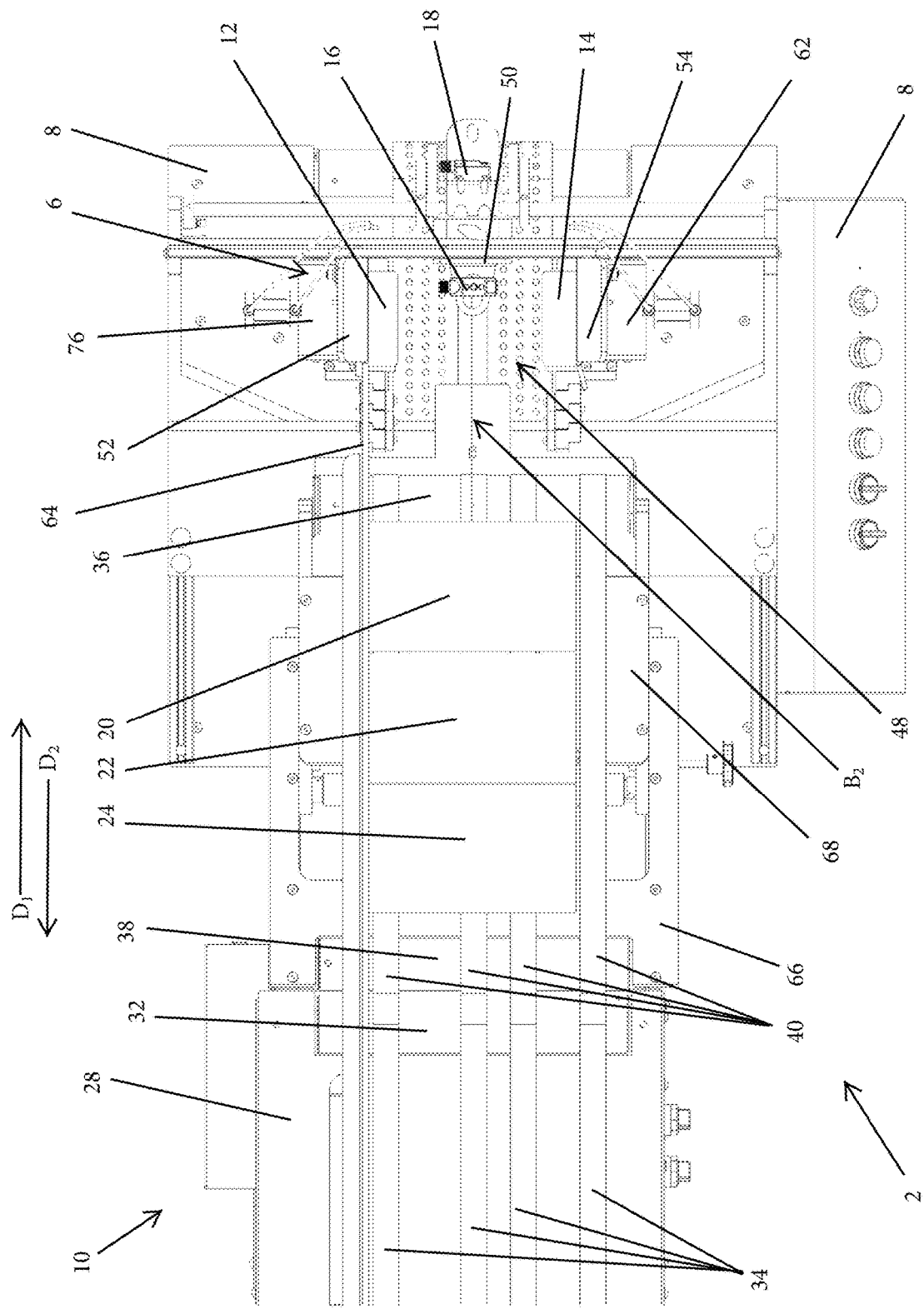
FIG. 7 is a plan view of a portion of an automatic loader and feeder according to an embodiment of the invention.

FIG. 4 illustrates the hopper 6 of the feeder 8 awaiting the vertically stacked media 4.

The actuated plates 12, 14 are arranged at the discharge end 46 of the conveying device 10 and are actuatable to move between an extended state (FIG. 4) and a retracted state. When in the extended state, the actuated plates 12, 14 support the vertically stacked media 4 that is moved into the hopper 6 in an elevated position above a feeder belt(s) 56 of the feeder 8. When in the extended state, the actuated plates 12, 14 may extend into a hopper area 48, which may be defined between an end plate 50, two side plates 52, 54 of the hopper 6, and the discharge end 46 of the conveying device 10. FIG. 4 shows the actuated plates 12, 14 in an extended state and projecting into the hopper area 48. In the extended state, the actuated plates 12, 14 may be considered as a continuation of a top surface 44 of the second continuous belt assembly 40.

When the vertically stacked media 4 is in the hopper 6 is in the elevated position, a bottom surface of the vertically stacked media 4 that is in the hopper 6 may be in plane with the top surface 44 of the second continuous belt assembly 40, or may be in a plane located between the top surface 44 of the second continuous belt assembly 40 and a top surface of the feeder belt 56 of the feeder 8.

When in the retracted state, the actuated plates 12, 14 do not support the vertically stacked media 4 that is in the hopper 6 in the elevated position, and therefore, the vertically stacked media 4 that is in the hopper 6 is thereby free to fall onto the feeder belt 56 of the feeder 8. When in the retracted state, the actuated plates 12, 14 are not arranged in the hopper area 48, and may be for example, retracted, folded, rotated, or otherwise moved out of the hopper area 48 so as to allow the vertically stacked media 4 that is in the hopper 6 to drop down on the feeder belt 56 of the feeder 8.

The first sensor 16 is in communication with the conveying device 10 and the actuated plates 12, 14, and senses a height of the vertically stacked media 4 that is in the hopper 6. The first sensor 16 may be arranged on the feeder 8, such as for example, on the end plate 50 of the hopper 6 as depicted in the figures. The first sensor 16 may be arranged above the vertically stacked media 4 that is in the hopper 6. The first sensor 16 may be arranged on the hopper 6 of the feeder 8, e.g. on an upper portion of the end plate 50. The first sensor 16 may emit a beam $B_1$ downward toward a top surface of the vertically stacked media 4 that is in the hopper 6 in order to sense a distance to the top surface of the vertically stacked media 4 that is in the hopper 6. This sensed distance may define the height of the vertically stacked media 4 that is in the hopper 6. The beam $B_1$ may be perpendicular to the top surface of the vertically stacked media 4 that is in the hopper 6.

When the height of the vertically stacked media 4 that is in the hopper 6 is less than a first predetermined threshold, the first sensor 16 generates a first signal that is communicated to the actuated plates 12, 14 and to the conveying device 10. The first signal initially causes the actuated plates 12, 14 to be in the extended state or move to the extended state from the retracted state. The first signal then causes the conveying device 10 to move the vertically stacked media 4 that is in the staging area in the first direction $D_1$. The vertically stacked media 4, or a portion thereof, may be moved off of the conveying device 10, into the hopper 6, and onto the actuated plates 12, 14 that are in the extended state.

A power source 58 of the automatic loader 2, which may include a motor drive for example, can be actuated by the first signal to cause the conveying device 10 to move the vertically stacked media 4 in the first direction $D_1$. To accomplish this, one or more of the conveyor belt assembly 28 and the adjustable table 30 may be actuated by the power source 58, such that one or both of the first continuous belt assembly 34 is rotated around the first pair of rollers (e.g. so that the top surface 42 moves to the right in the figures) and the second continuous belt assembly 40 is rotated around the second pair of rollers 36, 38 (e.g. so that the top surface 44 moves to the right in the figures) so as to move the vertically stacked media 4 in the first direction $D_1$.

As the vertically stacked media 4 is moved into the hopper 6, the actuated plates 12, 14 are in the extended state, such that the vertically stacked media 4 that is moved into the hopper 6 (e.g. the first vertical stack 20) is supported in the elevated position within the hopper area 48.

The second sensor 18 is in communication with the conveying device 10 and the actuated plates 12, 14, and senses a separation between the hopper 6 and the vertically stacked media 4 that is being moved in the first direction $D_1$. The second sensor 18 may be arranged on the feeder 8, such as on the end plate 50 of the hopper 6 as depicted in the figures. The second sensor 18 may be arranged in front of the vertically stacked media 4 that is moving the in first direction $D_1$. The second sensor 18 may emit a beam $B_2$ towards a leading surface of the vertically stacked media 4 that is moving the in first direction $D_1$ in order to sense a distance to the leading surface of the vertically stacked media 4 that is moving the in first direction $D_1$. This sensed distance may define the separation between the hopper 6 and the vertically stacked media 4 that is being moved in the first direction $D_1$. The beam $B_2$ may be emitted through a hole 70 in the end plate 50, in a second direction $D_2$ that is opposite of the first direction $D_1$, and may be perpendicular to the leading surface of the vertically stacked media 4 that is being moved in the first direction $D_1$.

Figure 3:
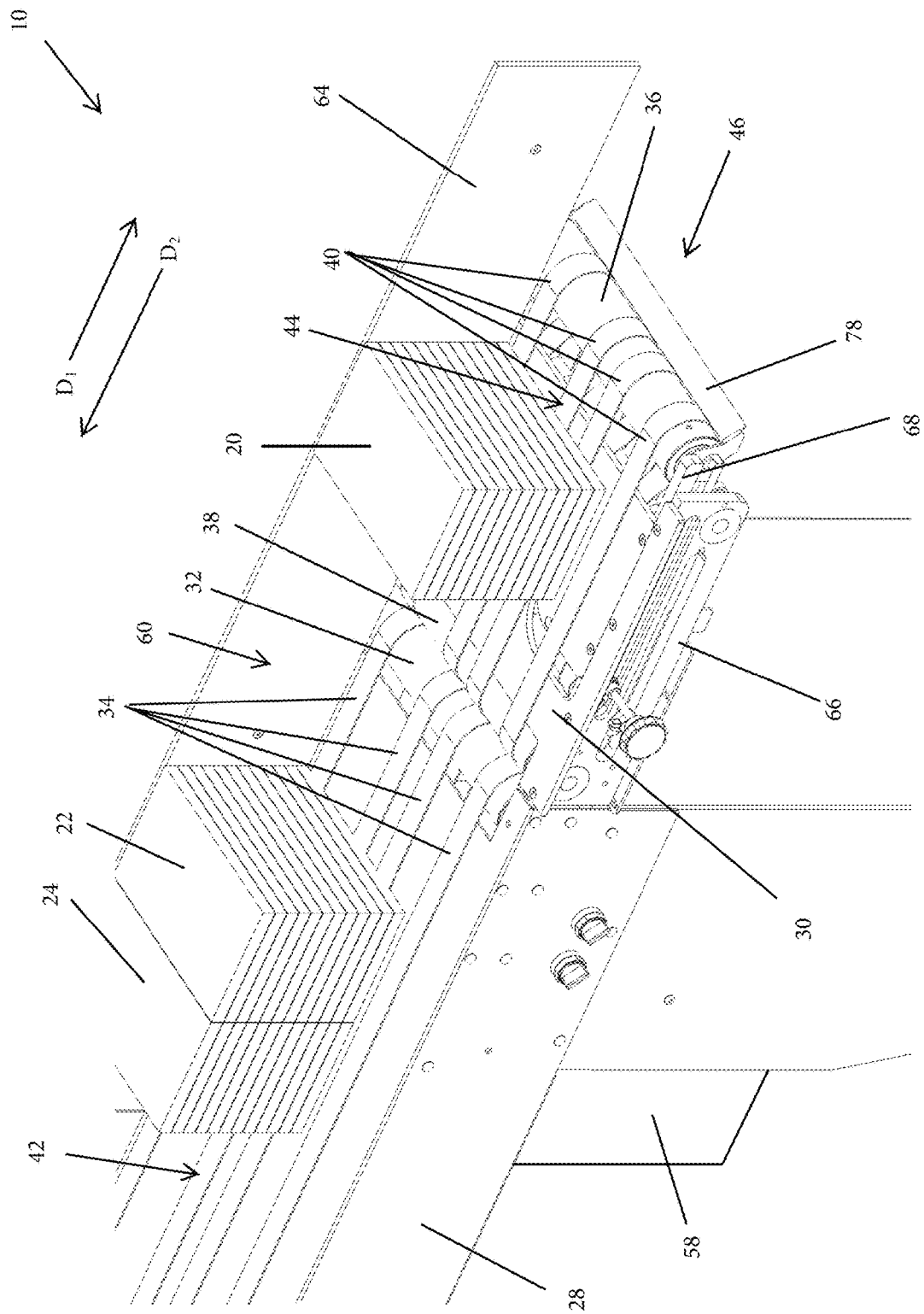
FIG. 3 is a perspective view of a portion of an automatic loader according to another embodiment of the invention.

When the separation is less than a second predetermined threshold (e.g. when the first vertical stack 20 is in the hopper 6 or when the first vertical stack 20 contacts the end plate 50), the second sensor 18 generates a second signal that is communicated to the conveying device 10 and to the actuated plates 12, 14. The second signal causes the conveying device 10 to stop moving the vertically stacked media 4 in the first direction $D_1$. In one aspect, the second signal may cause the conveying device 10 to move the remaining vertically stacked media 4 that is in the staging area (e.g. the second vertical stack 22 and optionally the third vertical stack 24), in the second direction $D_2$. This movement of the vertically stacked media 4 that is in the staging area in the second direction $D_2$ may cause a gap 60 to form between the first vertical stack 20 and the second vertical stack 22 as depicted in FIG. 3. Moving the vertically stacked media 4 in the second direction $D_2$ may be accomplished by one or more of the conveyor belt assembly 28 and the adjustable table 30 being actuated by the power source 58, such that the first continuous belt assembly 34 is rotated around the first pair of rollers (e.g. so that the top surface 42 moves to the left in the figures) and/or the second continuous belt assembly 40 is rotated around the second pair of rollers 36, 38 (e.g. so that the top surface 44 moves to the left in the figures) so as to move the vertically stacked media 4 in the second direction $D_2$. The second signal then causes the actuated plates 12, 14 to move to the retracted state, thereby allowing the vertically stacked media 4 that was supported in the elevated position (e.g. the first vertical stack 20) to fall to the bottom of the hopper 6 and onto the feeder belt 56 of the feeder 8. Movement of the actuated plates 12, 14 between the extended state and the retracted state may be accomplished by actuators 62, 76 connected to the actuated plates 12, 14. The actuators 62, 76 may be electronic or pneumatic. The gap 60 formed between the first vertical stack 20 and the second vertical stack 22 may allow the first vertical stack 20 to fall onto the feeder belt 56 without being inhibited by contact with the second vertical stack 22.

Moving the vertically stacked media 4 in the second direction $D_2$ may be performed after a portion of the vertically stacked media 4 (e.g. the first vertical stack 20) is moved off of the conveying device 10, and before the second signal causes the actuated plates 12, 14 to move to the retracted state.

The conveying device 10 may include a guide wall 64 arranged on one side of the conveying device 10 and extending in the first direction $D_1$. The guide wall 64 is configured to guide the vertically stacked media 4 that is in the staging area as it is moved in the first direction $D_1$ and into the hopper 6. As depicted in the figures, the guide wall 64 runs along a length of the conveying device 10 and extends in the first direction $D_1$ past the discharge end 46. The guide wall 64 extends vertically up from the conveying device 10 and perpendicularly up from the staging area, i.e. from the top surface 42 of the first continuous belt assembly 34 and from the top surface 44 of the second continuous belt assembly 40. This arrangement of the guide wall 64 allows the vertically stacked media 4 to be pressed against and aligned with the guide wall 64 so as to keep the vertically stacked media 4 in a more ordered and even vertical stack. The guide wall 64 also allows for quicker loading of the vertically stacked media 4 onto the conveying device 10 because less care is required for properly aligning the vertically stacked media 4 on the staging area and for delivery to the hopper 6. In one embodiment, the guide wall 64 is aligned (e.g. coplanar) with the side plate 52 of the hopper 6 and may even contact the side plate 52. An angled wall 74 may be attached to the side plate 54. The angled wall 74 is angled with respect to the side plate 54 as shown in the figures, such that the angled wall 74 funnels the vertically stacked media 4 into the hopper 6 between the side plates 52, 54.

The conveying device 10 may include a ramp 78 arranged at the discharge end 46. The ramp 78 may be attached to the exit roller 36, and may be angle down going away from the exit roller 36 in the first direction $D_1$ as shown in the FIG. 3, in order to facilitate delivery of the vertically stacked media 4 into the hopper 6.

The automatic loader 2 may include an electronic controller 72 in communication with the conveying device 10, the actuated plates 12, 14, the first sensor 16, and the second sensor 18. The controller 72 may be configured to receive the first signal and the second signal. The controller 72 may be used to control the actuators 62, 76 to actuate the actuated plates 12, 14 to move them between the extended state and the retracted state, and to control the power source 58 to actuate the conveying device 10 to move the vertically stacked media 4 that is in the staging area in the first direction $D_1$ or in the second direction $D_2$.

In one embodiment, when the vertically stacked media 4 comprises at least the first vertical stack 20 and the second vertical stack 22, then the first signal from the first sensor 16 is used to measure a height of the vertically stacked media that is in the hopper 6. The first sensor 16 may determine if the height of the vertically stacked media that is in the hopper 6 is less than the first predetermined threshold. If no media is in the hopper 6, then the first signal is generated because the sensed height is zero, and therefore less than the first predetermined threshold. The first signal causes the actuated plates 12, 14 to be in the extended state, and causes the conveying device 10 to move the first vertical stack 20 and the second vertical stack 22 in the first direction $D_1$ toward the discharge end 46. Movement in the first direction $D_1$ continues until the first vertical stack 20 is moved off of the conveying device 10 and into the hopper 6 and onto the actuated plates in the extended state. When the first vertical stack 20 is moved into the hopper 6, so that it contacts the end plate 50 for example, the sensed separation is below the second predetermined threshold. The second signal is then generated by the second sensor 18 such that movement of the vertically stacked media 4 in the first direction $D_1$ is halted, and the second vertical stack 22, and if present the third vertical 24 and further vertical stacks, remains on the conveying device 10. The second signal can cause the conveying device 10 to move the second vertical stack 22, and other vertical stacks if present, in the second direction $D_2$ to create a gap 60 between the first vertical stack 20 and the second vertical stack 22. Then the second signal causes the actuated plates 12, 14 to move to the retracted state, thereby allowing the first vertical stack 20 of flat media to fall from the elevated position down onto the feeder belt 56 of the feeder 8. The feeder belt 56 may remove the flat pieces of the media from a bottom of the first vertical stack 20 one at a time. This continues until the first sensor 16 again senses that the height of the first vertical stack 20 in the hopper 6 is less than the first predetermined threshold, at which point the first signal is generated and the process begins again for the second vertical stack 22 and further vertical stacks.

In an embodiment, a system for processing vertically stacked media comprises a feeder 8 and the automatic loader 2 as described herein. As discussed, the feeder 8 includes a hopper 6 and a feeder belt 56 under the hopper 6. The hopper 6 includes a first side plate 52, a second side plate 54, and an end plate 50. The first sensor 16 of the automatic loader 2 is mounted to a top portion of the end plate 50, and a beam $B_1$ emitted by the first sensor 16 is transmitted downward as shown in FIG. 4. The second sensor 18 of the automatic loader 2 is mounted at a side of the end plate 50 opposite from hopper 6, and a beam $B_2$ emitted by the second sensor 18 is transmitted through a hole 70 in the end plate 50 toward the conveying device 10.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

What is claimed is:

1. An automatic loader for delivering vertically stacked media to a hopper of a feeder that is associated with the loader, the loader comprising:
   a powered conveying device defining a staging area for the vertically stacked media, the staging area defining a discharge end arranged closest to the hopper, the conveying device being actuatable to move the vertically stacked media that is in the staging area in a first direction toward the discharge end, off of the conveying device, and into the hopper;
   actuated plates movably arranged at the discharge end of the conveying device and actuatable to move between an extended state and a retracted state,
      wherein in the extended state, the actuated plates support the vertically stacked media that is moved into the hopper in an elevated position above a feeder belt of the feeder, and
      wherein in the retracted state, the actuated plates do not support the vertically stacked media that is moved into the hopper in the elevated position, and the vertically stacked media that is moved into the hopper is thereby free to fall onto the feeder belt of the feeder;
   a first sensor in communication with the conveying device and the actuated plates, said first sensor being configured to sense a height of the vertically stacked media that is in the hopper and, when the height is sensed to be less than a first predetermined threshold, to generate a signal to move the actuated plates to the extended state and to move the vertically stacked media in the staging area of the conveying device in the first direction, off of the conveying device, into the hopper, and onto the actuated plates to be supported in the elevated position; and
   a second sensor in communication with the conveying device and the actuated plates, said second sensor being configured to sense a separation between the hopper and the vertically stacked media that is being moved in the first direction and, when the separation is sensed to be less than a second predetermined threshold, to generate a signal to stop moving the vertically stacked media in the staging area of the conveying device in the first direction and to move the actuated plates to the retracted state thereby allowing the vertically stacked media that was supported in the elevated position to fall onto the feeder belt of the feeder.

2. The automatic loader of claim 1, further comprising a guide wall arranged on one side of the conveying device, said guide wall being configured to guide the vertically stacked media that is in the staging area as it is moved in the first direction.

3. The automatic loader of claim 2, wherein the guide wall extends in the first direction past the discharge end.

4. The automatic loader of claim 1, further comprising a ramp attached to an exit roller of the conveying device, wherein the ramp and the exit roller are arranged at the discharge end, and the ramp is angled downwardly away from the exit roller.

5. The automatic loader of claim 1, wherein the conveying device comprises:
   a powered conveyor belt assembly including a first pair of rollers and a first continuous belt assembly arranged on the first pair of rollers, the conveyor belt assembly being operable to rotate the first continuous belt assembly around the first pair of rollers, and
   a powered adjustable table including a second pair of rollers and a second continuous belt assembly arranged on the second pair of rollers, the adjustable table being operable to rotate the second continuous belt assembly around the second pair of rollers, the adjustable table being adjustable to increase or decrease a distance between the second pair of rollers.

6. The automatic loader of claim 5, wherein a top surface of the first continuous belt assembly and a top surface of the second continuous belt assembly define the staging area.

7. The automatic loader of claim 6, wherein the top surface of the first continuous belt assembly is coplanar with the top surface of the second continuous belt assembly.

8. The automatic loader of claim 5, wherein rotation of the first continuous belt assembly around the first pair of rollers is independent of rotation of the second continuous belt assembly around the second pair of rollers.

9. The automatic loader of claim 5, wherein the first continuous belt assembly includes a first set of separate continuous belts arranged around the first pair of rollers.

10. The automatic loader of claim 5, wherein the second continuous belt assembly includes a second set of separate continuous belts arranged around the second pair of rollers.

11. The automatic loader of claim 5, further including a power source for powering the conveying device, wherein:
the power source provides power to the conveyor belt assembly to rotate the first continuous belt assembly around the first pair of rollers, and
the power source provides power to the adjustable table to rotate the second continuous belt assembly around the second pair of rollers.

12. The automatic loader of claim 5, wherein:
the second set of rollers includes a fixed roller and an exit roller,
the fixed roller is arranged on a fixed frame and is closer to the conveyor belt assembly than to the exit roller, and
the exit roller is arranged on an adjustable frame connected the fixed frame and movable with respect to the fixed frame to thereby increase or decrease a distance between the fixed roller and the exit roller.

13. The automatic loader of claim 1, wherein, when the vertically stacked media comprises at least a first vertical stack of media and a second vertical stack of media and the first vertical stack of media is closer to the hopper than the second vertical stack of media, in response to the signal from the first sensor the conveying device moves the first vertical stack of media into the hopper, and when the first vertical stack of media is moved into the hopper, in response to the signal from the second sensor, the second vertical stack of media remains on the conveying device.

14. The automatic loader of claim 13, wherein, based on the signal from the second sensor, the conveying device moves the second vertical stack of media in a second direction opposite from the first direction to create a gap between the first vertical stack of media and the second vertical stack of media, and the actuated plates move to the retracted state, thereby allowing the first vertical stack of media to fall onto the feeder belt of the feeder.

15. The automatic loader of claim 1, further including a power source for powering the conveying device.

16. The automatic loader of claim 1, wherein:
the first sensor and the second sensor are laser sensors,
a beam emitted by the first sensor is perpendicular to a top surface of the vertically stacked media that is in the hopper, and
a beam emitted by the second sensor is perpendicular to a front surface of the vertically stacked media that is being moved in the first direction.

17. The automatic loader of claim 1, wherein the first sensor and the second sensor are arranged on the feeder.

18. The automatic loader of claim 1, further including a controller in communication with the conveying device, the actuated plates, the first sensor, and the second sensor, and configured to:
receive the signal from the first sensor and the signal from the second sensor,
actuate the plates to move between the extended state and the retracted state, and
actuate the conveying device to move the vertically stacked media that is in the staging area in the first direction.

19. A system for processing vertically stacked media, comprising a feeder and the automatic loader of claim 1, wherein:
the feeder includes a hopper and a feeder belt under the hopper;
the hopper includes a first side plate, a second side plate, and an end plate,
the first sensor of the automatic loader is mounted to a top portion of the end plate, and a beam emitted by the first sensor is transmitted downward; and
the second sensor of the automatic loader is mounted at a side of the end plate opposite from the hopper, and a beam emitted by the second sensor is transmitted through a hole in the end plate toward the automatic loader.

20. The system of claim 19, wherein:
the guide wall and the first side plate are coplanar,
the system further includes an angled wall attached to the second side plate, and configured to funnel the vertically stacked media into the hopper.

* * * * *